(12) United States Patent
Pupille et al.

(10) Patent No.: US 11,685,556 B2
(45) Date of Patent: Jun. 27, 2023

(54) RADIATOR WITH REDUCED SOLAR IRRADIATION AND IMPROVED GUIDANCE SYSTEM FOR GEOSTATIONARY SATELLITE

(71) Applicant: AIRBUS DEFENCE AND SPACE SAS, Toulouse (FR)

(72) Inventors: Gilles Pupille, Toulouse (FR); Bernard Deltour, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 17/802,344

(22) PCT Filed: Feb. 9, 2021

(86) PCT No.: PCT/FR2021/050229
§ 371 (c)(1),
(2) Date: Aug. 25, 2022

(87) PCT Pub. No.: WO2021/170931
PCT Pub. Date: Sep. 2, 2021

(65) Prior Publication Data
US 2023/0095742 A1 Mar. 30, 2023

(30) Foreign Application Priority Data
Feb. 27, 2020 (FR) ..................................... 2001967

(51) Int. Cl.
*B64G 1/50* (2006.01)
*B64G 1/22* (2006.01)
*B64G 1/10* (2006.01)

(52) U.S. Cl.
CPC .............. *B64G 1/503* (2013.01); *B64G 1/10* (2013.01); *B64G 1/222* (2013.01)

(58) Field of Classification Search
CPC ........... B64G 1/503; B64G 1/10; B64G 1/222
See application file for complete search history.

(56) References Cited

U.S. PATENT DOCUMENTS

2016/0297551 A1* 10/2016 Cael ....................... B64G 1/222

FOREIGN PATENT DOCUMENTS

| EP | 3 055 212 B1 | 11/2017 |
| FR | 3 006 298 A1 | 12/2014 |
| RU | 2 684 229 C1 | 4/2019 |

OTHER PUBLICATIONS

French International Search Report with English Translation for PCT/FR2021/050229, dated May 7, 2021, 4 pages.
(Continued)

*Primary Examiner* — Valentina Xavier
(74) *Attorney, Agent, or Firm* — Nixon & Vanderhye P.C.

(57) ABSTRACT

A radiator for a geostationary satellite is disclosed having a radiative panel perpendicular to a radiation axis, and pivoting relative to the radiation axis, a mounting foot for the panel, a motor which rotates the mounting foot about a rotation axis, the radiation axis and the rotation axis being tilted relative to each other by an angle corresponding to the angle of the satellite's orbital plane relative to the ecliptic plane of the planet, and a guidance system for the panel, limiting rotation of the panel about the rotation axis, including a connecting arm pivoting relative to the satellite about a first axis and relative to the panel about a second axis concurrent with the first axis at a point of intersection of all the axes.

15 Claims, 8 Drawing Sheets

(56) References Cited

OTHER PUBLICATIONS

French Written Opinion of the ISA for PCT/FR2021/050229, dated May 7, 2021, 5 pages.

* cited by examiner

RADIATOR WITH REDUCED SOLAR IRRADIATION AND IMPROVED GUIDANCE SYSTEM FOR GEOSTATIONARY SATELLITE

CROSS REFERENCE TO RELATED APPLICATIONS

The present application is a National Phase of International Application Number PCT/FR2021/050229 filed Feb. 9, 2021, which designated the U.S. and claims priority benefits from French Application Number FR2001967 filed Feb. 7, 2020, the entire contents of each of which are hereby incorporated by reference.

TECHNICAL FIELD

This application relates to the field of satellites in geostationary orbit, for example telecommunications satellites. More specifically, this application relates to a radiator for such a satellite and a satellite equipped with a radiator.

PRIOR ART

A geostationary satellite is typically in the form of a rectangular parallelepiped, on which are defined a north face, a south face, an east face, a west face, a face oriented towards the Earth, and an opposite face referred to as the anti-earth face. The north, south, east, and west faces are named to correspond to the cardinal points of the planet around which the satellite is placed. These orientations may be somewhat skewed relative to their definition in order to meet certain operational or positional constraints.

One severe constraint on a satellite concerns thermal control of the various constituent parts and dissipation of the heat load generated by these constituent parts. Heat is discharged from the satellite by radiation, by means of one or more radiators. A radiator is generally in the form of a panel, of which one or both of the main faces form the radiative surfaces. Pipes for coolant connect the heat-producing satellite equipment and the radiative surfaces in a closed circuit, so that the coolant is heated in proximity to the satellite equipment, and circulates to the radiative surfaces to be cooled before circulating back to the satellite equipment.

In order to maximize the efficiency of the radiator in terms of heat rejection, it is necessary that the radiator be subjected to as little solar irradiation as possible, also called insolation.

In this respect, known from patent EP 3 055 212 B1 granted to the Applicant is a radiator for a geostationary satellite in which solar irradiation is minimized.

To achieve this, the radiator comprises a mounting foot for a radiating panel comprising at least one radiative surface, the mounting foot being mounted so as to pivot about a rotation axis, and the radiative surface extending perpendicularly to a radiation axis which is tilted relative to the rotation axis of the foot by a fixed operating angle corresponding to the angle of inclination of the satellite's orbital plane, namely an angle of approximately 23.5° for the Earth.

In addition, the radiator is controlled so that, for any rotation of the mounting foot about the rotation axis, the radiative surface remains parallel to the ecliptic plane.

In this manner, the fixed tilt of the radiative surface ensures zero solar irradiation on the radiative surface, increasing the radiator's efficiency in cooling the satellite.

In addition, in order to limit the bulk associated with the panel, in particular for the other equipment of the satellite, that patent also provides that the panel is mounted so as to pivot about the radiation axis, and that the radiator further comprises a panel guidance system, preventing the panel from pivoting with the mounting foot about the rotation axis. This makes it possible to maintain the panel in a given orientation relative to the satellite, while maintaining the radiative surface(s) at a constant tilt that minimizes solar irradiation of the satellite.

In this case, the panel guidance system is formed by a rod forming a guide rail, rigidly fixed on one face of the satellite and extending parallel to the rotation axis, and a clamp fixed to the panel and engaging with the guide rail by gripping it on either side along two opposite directions. When the mounting foot rotates, the clamp can slide along the rail while preventing rotation of the panel relative to the satellite.

A disadvantage of this guidance mechanism is related to recurring issues with the tribology of space mechanisms operating under vacuum, i.e. friction and wear that can lead to premature wear and significant malfunctions in these mechanisms. In addition, this solution does not allow easily installing a system for play compensation and preloading, which are necessary in order to achieve the required rigidity performance.

SUMMARY

The aim of the invention is to improve the solution described above.

In particular, an object of the invention is to provide a radiator with minimal solar irradiation, presenting no risk of premature wear and satisfying rigidity requirements.

In this respect, the invention proposes a radiator for a satellite capable of being stationed in geostationary orbit around a planet in a plane that is inclined relative to the ecliptic plane, the radiator comprising:

at least one panel having at least one radiative surface extending perpendicularly to a radiation axis, the panel being mounted so as to pivot relative to said radiation axis, a mounting foot carrying the panel, and a motor suitable for rotating the mounting foot about a rotation axis, wherein the radiation axis and the rotation axis are tilted relative to each other by an operating angle corresponding to the angle of inclination of the satellite's orbital plane relative to the ecliptic plane, such that for any rotation of the mounting foot about the rotation axis, the radiative surface remains parallel to the ecliptic plane, and wherein the radiator further comprises a panel guidance system, limiting the rotation of the panel about the rotation axis, so as to maintain the panel in a given orientation relative to the satellite, characterized in that the panel guidance system comprises a connecting arm connecting the panel to the satellite, mounted so as to pivot relative to the satellite about a first axis, and mounted so as to pivot relative to the panel about a second axis concurrent with the first axis at a meeting point coincident with a point of intersection between the radiation axis and the rotation axis.

Advantageously, but optionally, the radiator according to the invention further comprises at least one of the following features.

The connecting arm may comprise a bearing at each end, extending respectively around the first axis and the second axis.

In one embodiment, the first axis and the second axis may be perpendicular, and the connecting arm is a bent arm comprising two mutually perpendicular portions.

In one embodiment, the first axis may extend parallel to a support face of the satellite on which the radiator is mounted.

The first axis may be perpendicular to the rotation axis.

In one embodiment, the panel has a substantially rectangular shape having a main dimension in a first direction, and the second rotation axis of the connecting arm relative to the panel is parallel to the first direction.

The radiator may further comprise a coolant circulation circuit suitable for circulation of a coolant in a closed loop between a piece of equipment of the satellite and the panel of the radiator, wherein the coolant circulation circuit comprises at least a first coolant pipe comprising at least:
- a first flexible portion extending transversely to the first rotation axis so as to be able to bend around a first bending point located on the first rotation axis, and
- a second flexible portion extending transversely to the second rotation axis so as to be able to bend around a second bending point located on the second rotation axis.

Each coolant pipe further comprises rigid portions extending on either side of each flexible portion. Alternatively, each coolant pipe may comprise a continuous flexible portion comprising the first flexible portion, the second flexible portion, and an intermediate flexible portion connecting these.

The connecting arm may further comprise a support for at least one coolant pipe.

In one embodiment, the radiator comprises a plurality of coolant pipes, each pipe comprising a first and a second flexible portion, wherein the first flexible portions of at least two pipes are placed next to each other transversely to the first rotation axis, and the second flexible portions of at least two pipes are placed next to each other transversely to the second rotation axis.

In one embodiment, the radiator further comprises at least a second coolant pipe, superimposed on the first pipe in a direction perpendicular to a plane defined by the first and the second rotation axis, the second pipe comprising a continuous flexible portion superimposed on the first flexible portion, the second flexible portion of the second pipe, and an intermediate portion connecting those of the first pipe.

In one embodiment, the mounting foot may comprise two portions, namely:
- a first portion suitable for mounting on the support face of the satellite, and
- a second portion on which the panel is mounted, the panel being mounted on the second portion by means of a bearing to allow rotation of the panel about the radiation axis.

The two portions of the mounting foot may be straight, the first portion extending along the rotation axis and the second portion extending along the radiation axis.

In some embodiments, the operating angle is 23.5°.

This description also relates to a satellite capable of being placed in orbit around the Earth, comprising at least one radiator according to the above description mounted on a support face of the satellite, the mounting foot of the radiator being fixed on the satellite so that the rotation axis is perpendicular to a reference face of the satellite, the reference face being a north face or a south face of the satellite.

The radiator described herein comprises a panel guidance system based on a connecting arm respectively assembled to the satellite and to the panel by two rotary connections. These rotary connections, which may be implemented for example by bearings, eliminate the problems associated with friction and premature wear of the parts. In addition, these rotary connections impart great simplicity and a low production cost to the guidance system.

In bearings, the clearance elimination and preloading are controlled and make it possible to satisfy the rigidity requirements of the mechanism, simply and without additional parts.

BRIEF DESCRIPTION OF DRAWINGS

Other features, details and advantages will become apparent upon reading the detailed description below, and upon analyzing the appended drawings, in which:

FIG. 3b shows a view in a plane perpendicular to that of FIG. 3a.

FIG. 4b shows a view in a plane perpendicular to that of FIG. 4a.

FIG. 5b shows a view in a plane perpendicular to that of FIG. 5a.

FIG. 6b shows a view in a plane perpendicular to that of FIG. 6a.

DESCRIPTION OF EMBODIMENTS

Figure 1A:
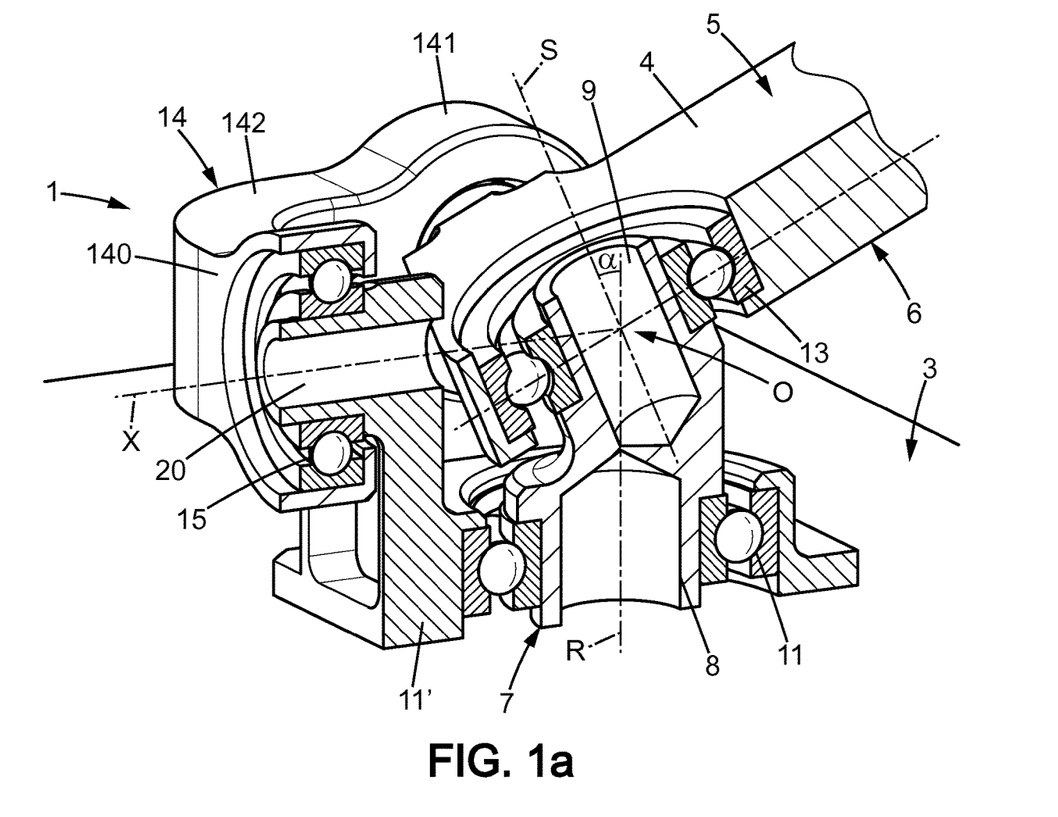
FIG. 1a is a schematic sectional view of a radiator mounted on a face of a satellite, according to one exemplary embodiment.

Schematically represented in section view in FIG. 1a is an embodiment of a radiator 1, intended to be mounted so as to rotate about a rotation axis R on a face of a satellite 2. Once mounted on the satellite 2, in practice the rotation axis R of the radiator 1 is oriented north-south, meaning it is perpendicular to the north and south faces of the satellite 1. However, the face on which the radiator 1 is mounted may be any face of the satellite 2, and the radiator 1 may comprise an intermediate support, possibly deployable, making it possible to give the rotation axis R a north-south orientation. In one embodiment represented in FIG. 2, it is the north face 3 of the satellite 1. Alternatively, as represented in FIG. 3, it may also be the anti-earth face. The main purpose of the satellite 2 is to be placed in geostationary orbit around a planet, typically the earth T.

The radiator 1 comprises a panel 4 which has at least one radiative surface 5, substantially planar. Preferably, the two opposite faces 5, 6 of the panel 4 are radiative surfaces. The radiative surfaces 5, 6 are oriented by a same axis which is referred to as the radiation axis S, meaning the axis perpendicular to the radiative surfaces 5, 6. A first face 5 is said to be upper, and the second face 6 is said to be lower.

As will be seen below, the rotation axis R and the radiation axis S are tilted relative to each other at a non-zero angle that is different from 90°. In other words, the rotation axis R is not parallel to the radiative surfaces 5, 6. The rotation axis R is also not perpendicular to these surfaces.

Figure 1B:
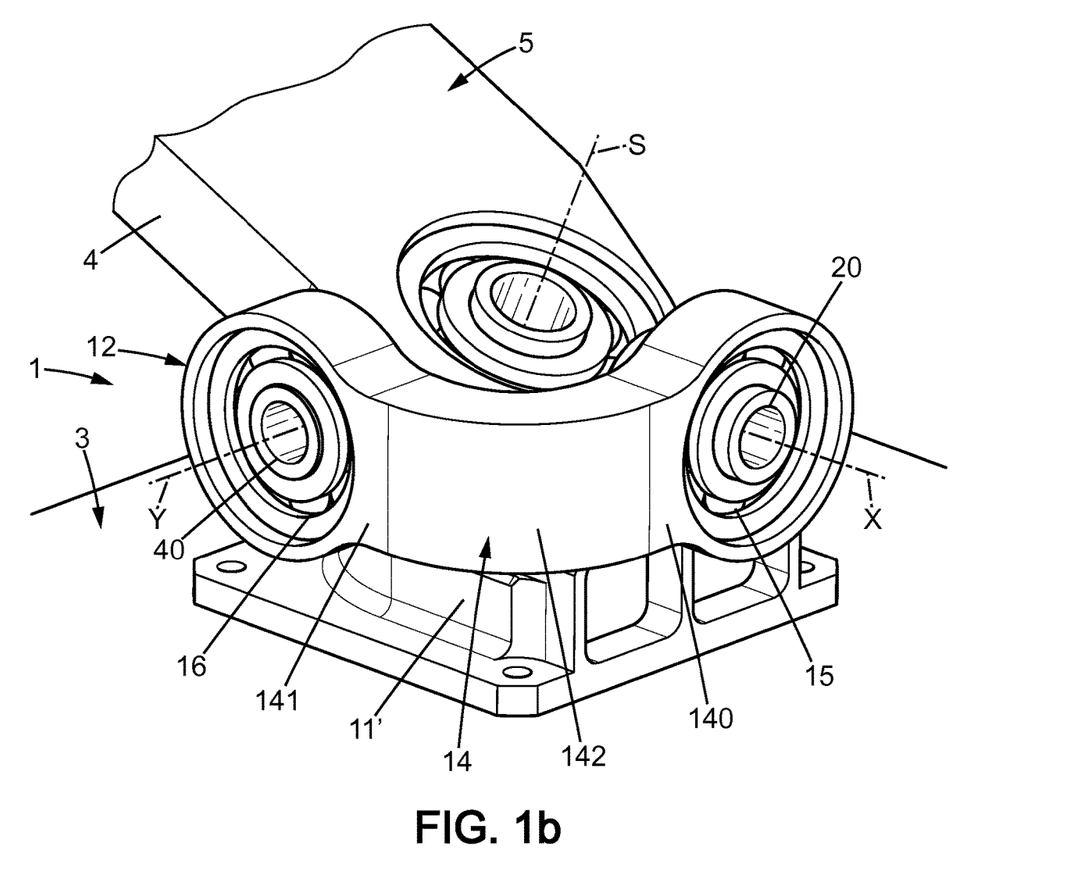
FIG. 1b shows a schematic view of a radiator mounted on a face of a satellite, according to one exemplary embodiment.

Preferably and as schematically represented in FIGS. 1a and 1b, the panel 4 extends on one side of the satellite 2, beyond the face of the satellite 2 on which it is mounted, so as not to interfere with other satellite equipment requiring proximity to the satellite 2 and to offer faces 5 and 6 a good view factor, also called the shape factor of the satellite 2; the radiator 1 comprises assembly means which include a mounting foot 7 which is rigid, meaning that no portion of the foot 7 is movable relative to another portion. Control and motorization means are provided for pivoting the mounting foot 7 about the rotation axis R, these means comprising in particular a motor 10 (schematically represented in FIGS. 3a to 6b) suitable for rotating the foot 7 about axis R.

Geostationary orbit is defined as being approximately 36,000 km above the equator, in the Earth's equatorial plane, and of zero eccentricity relative to the Earth. Although geostationary orbit refers to the Earth, the satellite 2 fitted with the radiator 1 described here could be adapted for other planets.

The geostationary orbit in the Earth's equatorial plane is therefore inclined relative to the ecliptic by an angle of 23.5°. Thus, the radiation axis S is tilted by an operating angle α relative to the rotation axis R, said angle α then being chosen to be equal to 23.5°. More generally, the operating angle α can be chosen according to requirements, within a range of values between 0° and 90°, the limits of the range being excluded ($\alpha \in\ ]0; 90°\,[$).

The satellite 2 in geostationary orbit is oriented in such a way that its so-called north and south faces are parallel to the plane of the geostationary orbit, throughout its operation. Indeed, in particular for telecommunications satellites, antenna-type instruments are mounted on the satellite in a precise orientation which must be preserved. The orientation of the satellite relative to the Earth is thus generally kept identical throughout its operation.

The tilt of the radiation axis S relative to the rotation axis R implies that the radiative surfaces 5, 6 are tilted by operating angle α relative to the north face 3 of the satellite 2. The radiative surfaces can thus remain parallel to the ecliptic plane for any rotation of the mounting foot 7 about the rotation axis R. Their solar irradiation is then zero, and their heat rejection capacity is then maximized.

The operating angle α is fixed, meaning it is determined when the radiator is designed. It is therefore not modified during operation of the radiator. Only the rotation of the mounting foot 7 about the rotation axis R must be controlled in order to keep the radiative surfaces 5, 6 parallel to the ecliptic plane. The assembly means are therefore simple to produce.

Alternatively, means for limited modification (by a few degrees) of this operating angle α during operation in order to compensate for a change in the orbital inclination may be provided, however. For example, a device having two positions could be used. More precisely, as will be seen below, it is not the operating angle α between the rotation axis R and the radiation axis S which is modified, but the angle between the radiative surfaces 5, 6 and the north face 3 of the satellite, such that, by compensation, the radiative surfaces 5, 6 are returned to the ecliptic plane.

In one embodiment, the mounting foot 7 comprises two straight portions 8, 9. A first portion 8 extends along the rotation axis R, and the second portion 9 extends along the radiation axis S. The two portions 8, 9 of the foot 7 are therefore tilted relative to each other by operating angle α. The second portion 9 may be in the extension of the first portion 8, such that there is a meeting point between the rotation axis R and the radiation axis S at the interface between the two portions 8, 9. Alternatively, these portions may be arranged so that a meeting point between the rotation axis R and the radiation axis S is not located at the interface between the two portions but within a plane of the panel 4, which implies that the base of the second portion, at the interface with the first portion, is slightly offset relative to the first portion, as shown for example in FIG. 1a.

The first portion 8 is mounted on the support face 3 of the satellite, for example the north or south face, by means of a bearing 11, and is connected to the control and motorization means. The first portion 8 extends substantially perpendicularly to the support face 3 on which it is mounted. For example, the inner race of the bearing is fixed on the foot 7, and the outer race is fixed on the support face 3 of the satellite. A housing 11', fixed to the outer race, covers the bearing 11 to protect it. During a complete rotation of the mounting foot 7 about the rotation axis R, the second portion 9 therefore traces a cone, the angle equal to the operating angle α.

The panel 4 is fixed to the second portion 9 of the foot 7. In practice, the panel 4 sits atop the second portion 9, meaning it is attached to the free end of the second portion 9.

Alternatively, the mounting foot 7 may be curved. In this case, the curve defined by the mounting foot 7 comprises at least a first tangent substantially parallel to the rotation axis R and a second tangent tilted by operating angle α relative to the first tangent. The panel 4 is then mounted perpendicularly to the second tangent.

If the mounting foot 7 were rigidly fixed to the panel 4, then for a complete rotation of the mounting foot 7 about the rotation axis R, the panel 4 would trace a circular path, its radius corresponding to the distance between the rotation axis R and the point of the panel 4 farthest from the rotation axis R, in a plane perpendicular to the rotation axis R. However, such a path may be obstructing for other equipment on the satellite. Such a path also limits the dimensions of the panel 4 to avoid collisions between the panel 4 and the satellite 2 during rotation about the rotation axis R.

Consequently, the radiator 1 comprises a panel guidance system 12, suitable for limiting and preferably eliminating the rotation of the panel about the rotation axis R when the mounting foot 7 is rotated by the motorization means 10, while allowing the panel to follow a movement in which the normal to the panel traces a cone of angle α about axis R. To achieve this, the panel 4 is mounted on the second portion 9 of the foot 7 so as to pivot about the radiation axis S. For example, a second bearing 13 between the second portion 9 of the foot 7 and the panel 4 makes it possible to obtain this rotation. The outer race of the second bearing 13 is rigidly fixed to the panel 4 surrounding the rolling bearing, the inner race being immobilized on the mounting foot 7.

In addition, the guidance system 12 comprises a connecting arm 14 connecting the panel 4 to the satellite, the connecting arm 14 being mounted so as to pivot relative to the satellite about a first axis X, and to pivot relative to the panel 4 about a second axis Y.

For this purpose, the connecting arm 14 advantageously comprises a first bearing 15 extending around axis X and receiving a cylindrical rod 20 integral with the satellite. For example, the cylindrical rod 20 may be integral with or formed as one piece with the housing 11' fixed to the outer race of the bearing and covering the latter. The connecting arm 14 further comprises a second bearing 16 extending around axis Y and receiving a cylindrical rod 40 integral with the panel, this cylindrical rod possibly being a protuberance from the panel dedicated to the connection with the connecting arm. Advantageously, the bearings 15, 16 are carried at the ends of the connecting arm. The first axis X and second axis Y are coplanar and concurrent, the meeting point of these axes moreover being coincident with a point of intersection of the radiation axis and the rotation axis. The axes R, S, X and Y are thus all concurrent at a point O. Moreover, neither of axes X and Y is parallel to one of the rotation R and radiation S axes.

In one embodiment, the connecting arm 14 is a bent arm comprising two portions 140, 141 integrally mounted to the outer race of each bearing, the portions being connected by a bent central portion 142, optionally rounded. Each bearing may be at the free end of each portion of the connecting arm.

In one embodiment, axes X and Y are mutually perpendicular. In this case, the bearings 15, 16 extend perpendicularly to each other, and portions 140, 141 are perpendicular to each other. In the case where X and Y are perpendicular to each other, the rotation of the panel about axis R is strictly zero. Otherwise, there remains an oscillation movement during rotation about R which is greater in amplitude when the angle between X and Y is smaller.

This bent arm with bearings that can be preloaded makes it possible to obtain the necessary rigidity for the mechanism.

In one embodiment, the first axis X extends parallel to the support face 3 of the satellite, and therefore perpendicular to the rotation axis R. The second axis Y preferably extends parallel to the direction of the main dimension of the panel, which reduces the size of the radiator.

The connecting arm makes it possible, through these rotations along two concurrent axes at the point of intersection of axes R and S, to constrain the movement of the panel during rotation of the mounting foot about the rotation axis R, to a conical movement in which the radiation axis S constitutes a generatrix, the panel being perpendicular to axis S at each point of its movement. In this manner, the panel remains parallel to the ecliptic plane, the radiating faces of the panel always being tilted relative to the north face of the satellite by an angle $\alpha$. However, the plane in which this tilt is measurable changes with the rotation of the foot about the rotation axis R, depending on the orientation of the second portion 9.

Figure 2:
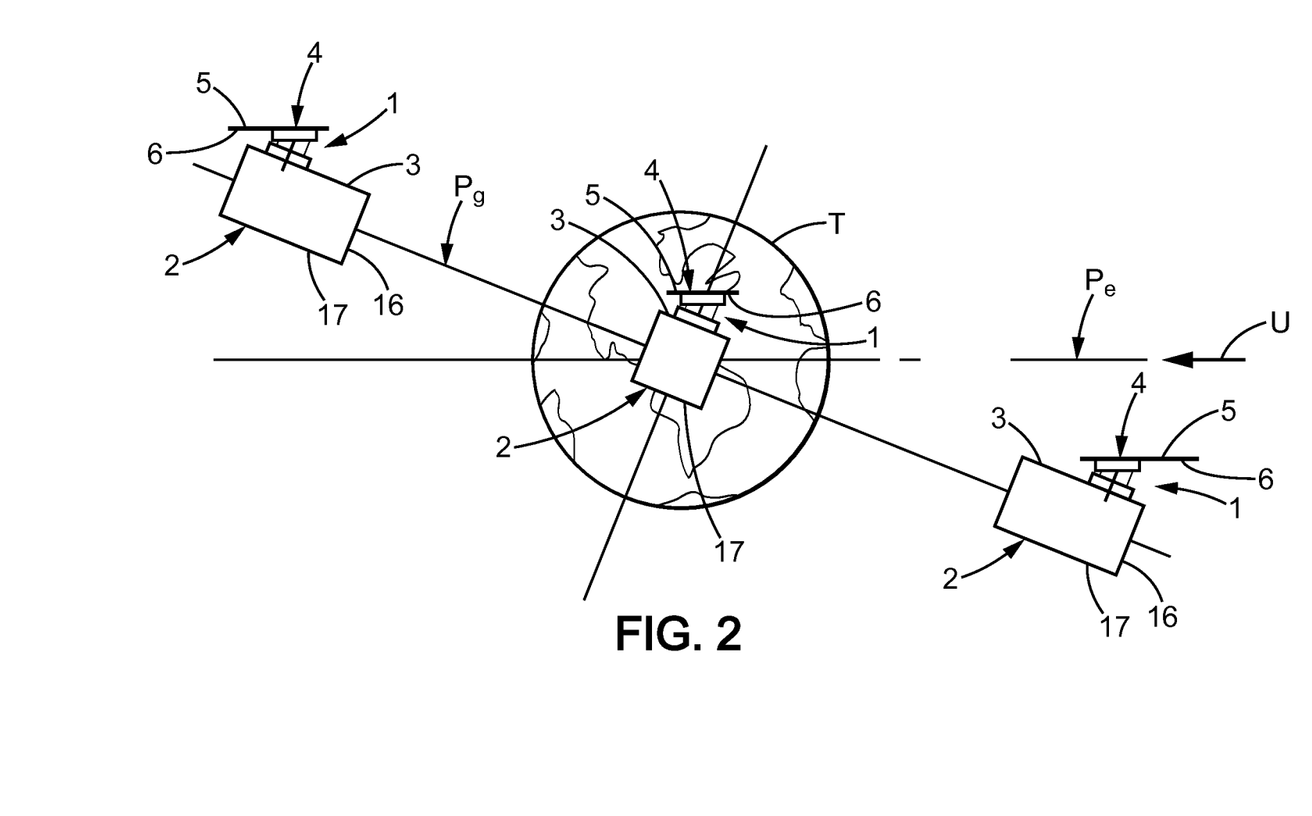
FIG. 2 is a schematic representation of a satellite provided with a radiator according to one embodiment of the invention, in orbit around the Earth, the satellite being represented in three different positions around the planet.
Figure 3A:
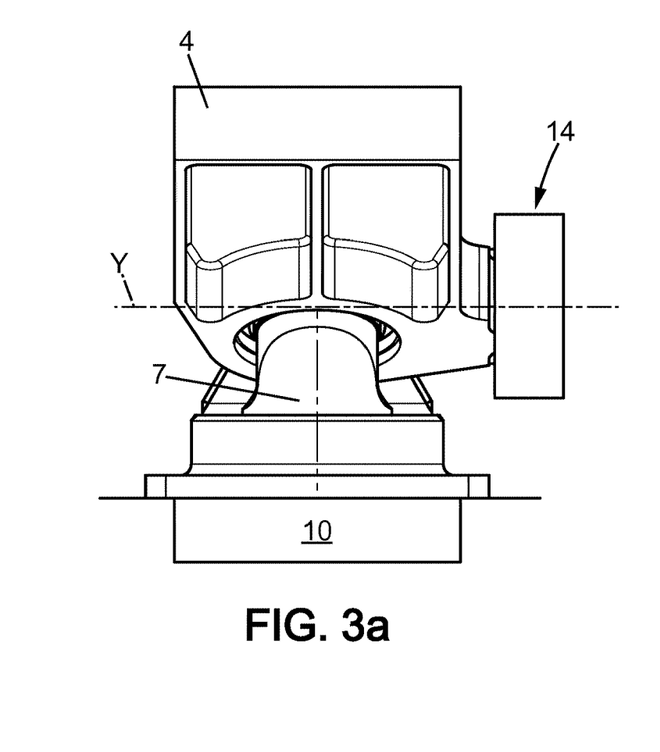
FIG. 3a shows a view of the radiator in one of the positions of FIG. 2.

Schematically represented in FIG. 2 is the satellite 2 in equatorial geostationary orbit around the earth T, in three different positions. The plane Pg of the satellite's equatorial geostationary orbit is tilted relative to the ecliptic plane Pe, at an angle of approximately 23.5°.

The control and motorization means are adapted so that the rotational speed of the foot follows the rotation of the Earth T. More precisely, the Earth T performs a complete rotation, i.e. 360°, around its axis in a day of 23 hours, 56 minutes and 4.1 seconds (called a sidereal day). In addition, the Earth takes 24 hours for the sun to return to the same position relative to a same point on the Earth, the Earth then having completed a rotation of approximately 360.9856° around its axis, thus defining a solar day.

Consequently, the control and motorization means 10 are adjusted so that the mounting foot 7 performs a complete rotation, i.e. 360°, in order to maintain a geostationary orbit, in 23 hours, 56 minutes and 4.1 seconds, so that the radiative surfaces 5.6 remain parallel to the ecliptic plane Pe. The direction of rotation of the mounting foot 7 is the opposite to that of the Earth. Thus, if the Earth rotates counterclockwise, the mounting foot 7 rotates anti-trigonometrically. The rotational speed of the mounting foot is constant.

Due to the rotation of the foot 7 about a single axis, the rotation axis R, from an initial position in which the radiative surfaces 5, 6 are parallel to the ecliptic plane Pe and at constant rotation speed, the parallelism of the initial position is maintained throughout the geostationary orbit of the satellite 2, without any adjustments being necessary during operation of the satellite 2.

Four examples of positions of a panel relative to the mounting foot 7 are thus represented in FIGS. 3a to 6b, successively adopted by the radiator during a complete rotation of the satellite. In FIGS. 3a, 4a, 5a, 6a, the view of the radiator is a view in a plane perpendicular to the first axis X. In FIGS. 3b, 4b, 5b, 6b, the view of the radiator is a view in a plane perpendicular to the support surface of the satellite and perpendicular to the plane of the view of FIGS. 3a, 4a, 5a, 6a.

Figure 3B:
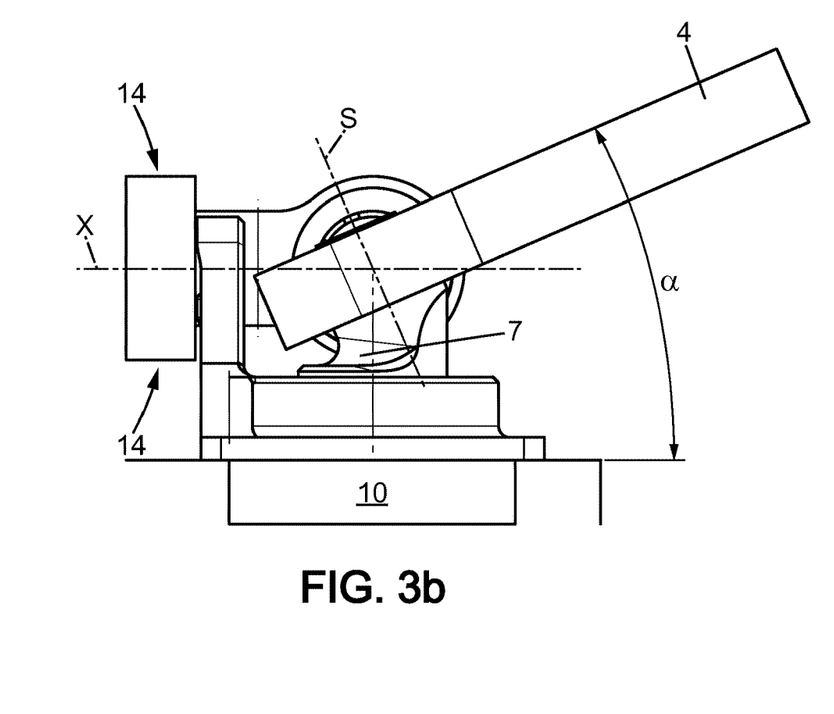
Figure 5A:
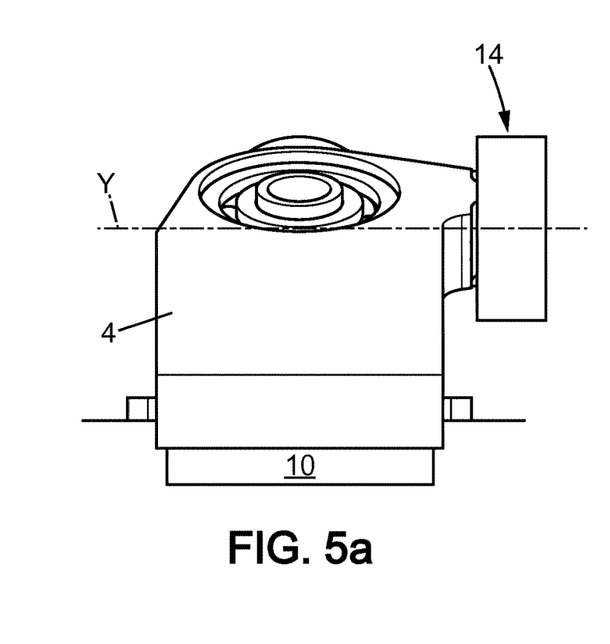
FIG. 5a shows a view of the radiator in a third position.
Figure 5B:
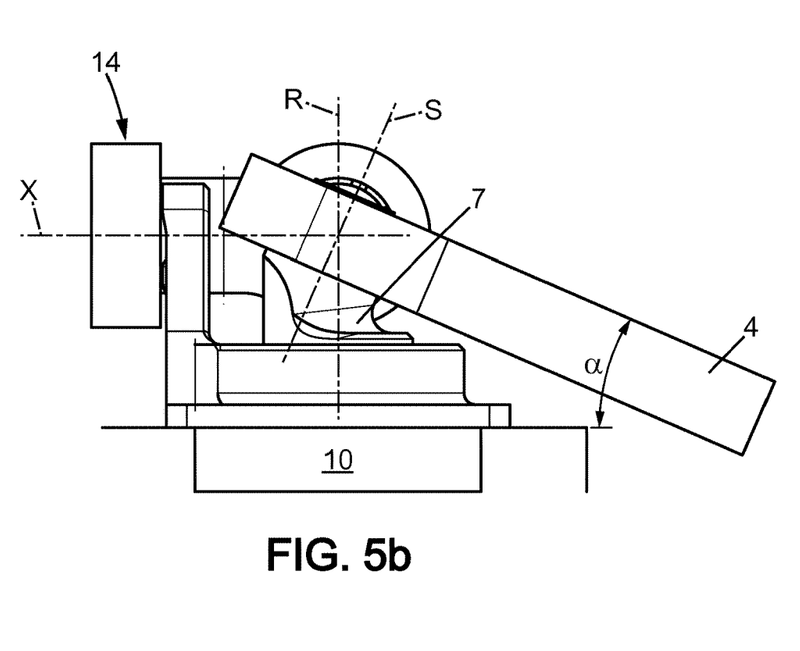

In FIGS. 3a and 3b, which correspond to the position of the satellite relative to the Earth shown furthest to the right in FIG. 2, the panel has zero tilt relative to the first axis X but a tilt angle $\alpha$ relative to the support surface of the panel about axis Y. In FIGS. 5a and 5b, which correspond to the leftmost position of the satellite in FIG. 2, meaning a position of the satellite, relative to the Earth, that is opposite to the first position, the panel has zero tilt relative to the first axis X but a tilt angle value a that is in the opposite direction relative to the support surface of the panel, about axis Y.

Figure 4A:
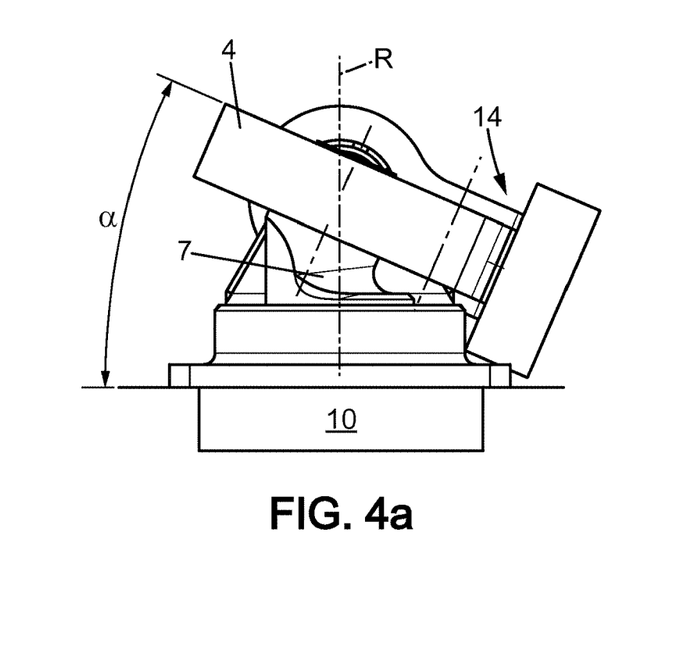
FIG. 4a shows a view of the radiator in a second position of FIG. 2.
Figure 4B:
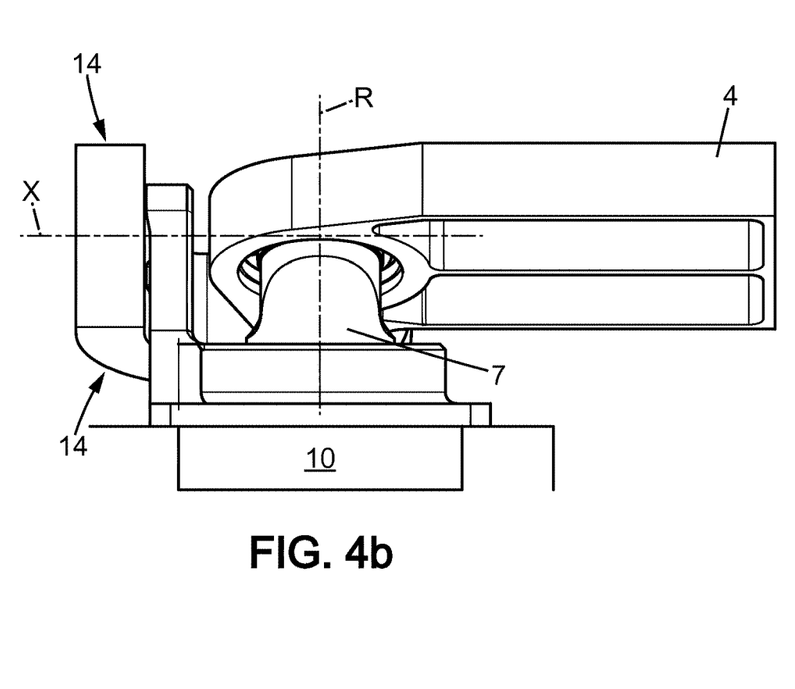
Figure 6A:
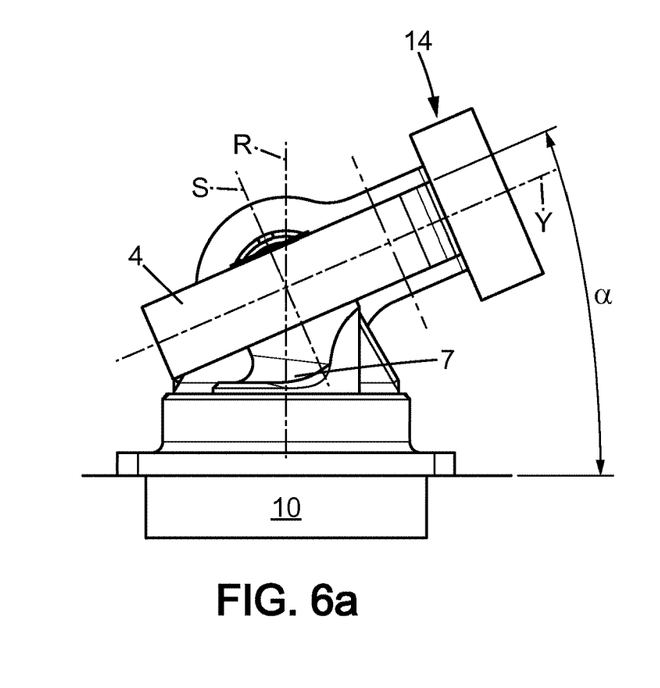
FIG. 6a shows a view of the radiator in a fourth position, also shown in FIG. 2.
Figure 6B:
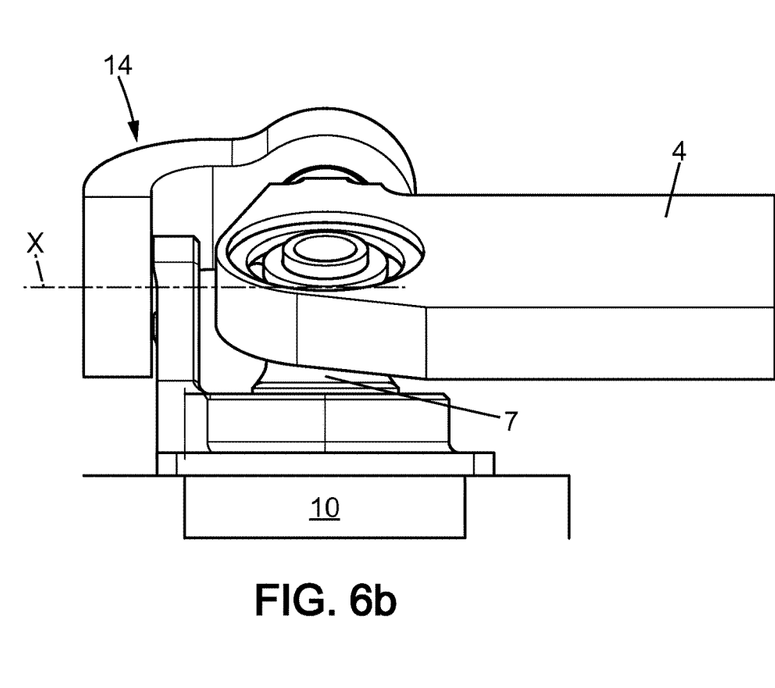

Conversely, FIGS. 4a and 4b on the one hand, and 6a and 6b on the other hand, correspond to two opposite positions of the satellite relative to the Earth, each position being a median position relative to the positions of FIGS. 3a and 3b on the one hand, and 5a and 5b on the other hand. In particular, the position shown in FIGS. 4a and 4b corresponds in FIG. 2 to the middle position of the satellite, while the position shown in FIGS. 6a and 6b is not shown in FIG. 2 because it would be behind the Earth, opposite to the satellite represented in the middle. In these positions, the tilt of the panel relative to the second axis Y is zero, while it is equal to angle $\alpha$ in one direction or in the opposite direction around the X axis.

All positions of the panel during a revolution of the satellite around the Earth are intermediate positions between these four positions.

In order to monitor the correct positioning of the panel relative to the ecliptic, the radiator may further comprise at least one solar sensor, connected to the control and motorization means 10, so as to verify and/or link the orientation of the panel relative to the Sun. The solar sensor makes it possible to verify the absence of solar irradiation on the radiative surfaces 5, 6, and to communicate with the control and motorization means 10 in order to undertake potential corrective operations on the rotation of the mounting foot 7.

Figure 7:
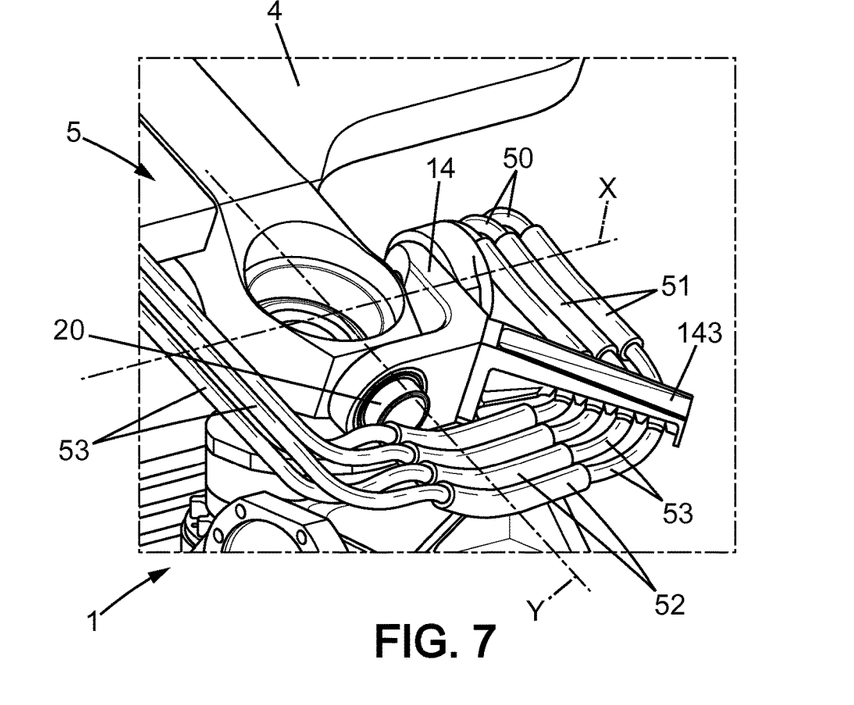
FIG. 7 shows an example arrangement of coolant circulation pipes relative to a radiator according to one embodiment.

Referring to FIG. 7, the radiator 1 described above may also comprise simplified fluid connection means. The radiator comprises at least one coolant circulation circuit suitable for circulation of a coolant in a closed loop between a piece of equipment of the satellite and the panel 4 of the radiator, and in this respect comprises one or more coolant pipes 50. However, the design of the layout of the coolant pipe(s) must take into account the movement of the panel 1, the pressure of the coolant, and the cross-sectional area of these pipes to allow sufficient flow to ensure the cooling of the satellite equipment.

In this regard, each coolant pipe 50 is advantageously adapted to extend from the satellite to the panel while bypassing the connecting arm, i.e. along an outer face of the connecting arm, and presenting:
- a first flexible portion 51 located next to the first rotation axis X, extending transversely thereto, so as to be able to bend around a first bending point located on the first rotation axis, and
- a second flexible portion 52 extending next to the second rotation axis Y, extending transversely thereto, so as to be able to bend around a second bending point located on the second rotation axis.

Each bending point is therefore located on a rotation axis X,Y of the connecting arm 14, on the opposite side of the panel relative to the connecting arm. The pipe is therefore adapted to be able to deform with the movement of the panel. A flexible pipe for the circulation of coolant in the spatial domain is typically produced by a corrugated conduit, i.e. crinkled so as to be flexible in bending. To prevent elongation of this corrugated pipe under the pressure of the fluid circulating inside, a braided sleeve surrounds the corrugated pipe and prevents any variation in the length of the pipe.

Thus, the aligning of the flexible portions 51, 52 of the coolant pipes, which are implemented in the same manner, with the rotation axes respectively X,Y, makes it possible to subject them to pure bending movement, and to no variation in length.

The flexible portions 51, 52 may, instead of being corrugated, have a helical configuration, giving these portions flexibility in bending.

Typically, for the closed loop circulation of coolant from the satellite equipment to the panel, then from the panel to the satellite equipment, the coolant circulation pipes are provided in pairs, each corresponding to a direction of circulation of the fluid. Consequently, in the case where several pipes 50 must be arranged to bypass or encircle the connecting arm as described above, the pipes are advantageously arranged so that all the first flexible portions 51 of the pipes are all placed next to each other, meaning arranged side by side and all extending transversely to the first rotation axis, and all the second flexible portions 52 of the pipes are also placed next to each other or arranged side by side, transversely to the second rotation axis Y.

In one embodiment, each coolant pipe comprises rigid portions 53 extending on either side of each flexible portion, and in particular a rigid intermediate portion 530 extending between the two flexible portions 51, 52. If the connecting arm 14 is in the form of an arm bent 90°, this rigid portion 530 is also bent 90° to extend along the connecting arm.

Alternatively, the intermediate portion 530 of the coolant pipe interconnecting the flexible first portion 51 and flexible second portion 52 may also be flexible. In other words, each coolant pipe 50 may then comprise a continuous flexible portion comprising the first portion 51 located next to the X axis, the second portion 52 located next to the Y axis, and an intermediate flexible portion 530 connecting these two portions.

Figure 8:
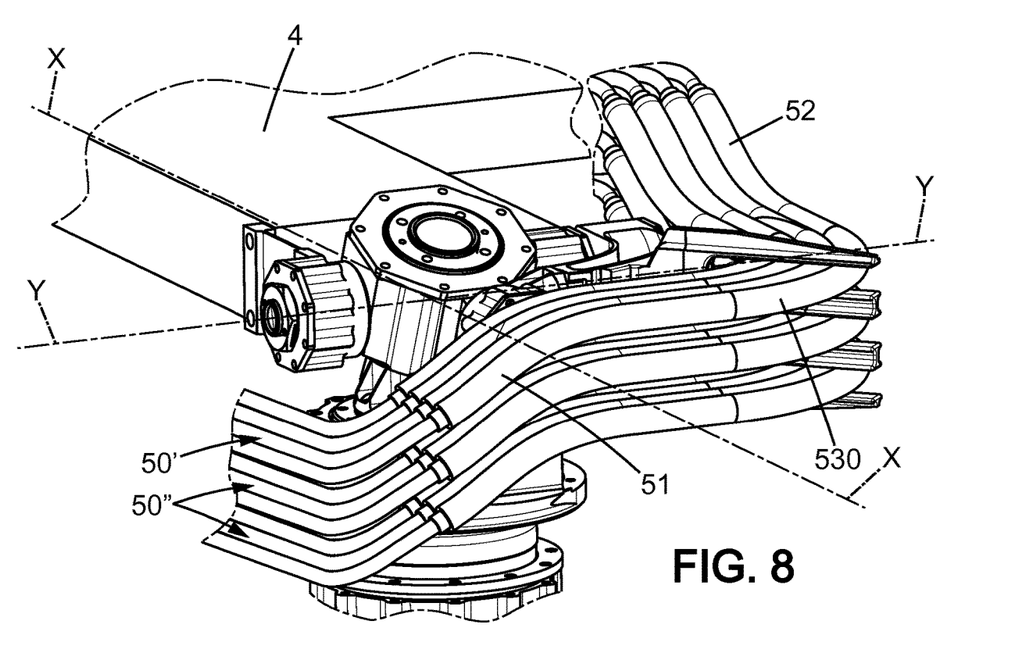
FIG. 8 shows an example arrangement of coolant circulation pipes relative to a radiator according to another embodiment.

In this case, and with reference to FIG. 8, the set of coolant pipes 50 may comprise one or more coolant pipes 50' aligned so that the first portions 51 are placed next to each other on axis X and the second portions 52 are placed next to each other on axis Y, and may further comprise second coolant pipes 50" which are respectively superimposed on the first pipes 50', in a direction perpendicular to the plane defined by the X and Y axes. The second coolant pipes 50" comprise a continuous flexible portion superimposed with the first flexible portion 51, the second flexible portion, and the intermediate portion, flexible or rigid, of a first pipe 50'. For example, two or three levels of superimpositions are thus conceivable. The fact that the pipes 50" are offset from the X and Y axes implies greater deformation during panel movement, but this deformation is permitted by the presence of the continuous flexible portion.

Advantageously, the connecting arm 14 may comprise a support 143 for at least one coolant pipe 50, and preferably an even number of pipes 50, for example between two and eight pipes. In the embodiments shown in FIGS. 7 and 8, the connecting arm 14 is bent 90° and the support 143 is attached to the connecting arm at the elbow, extending outward from the connecting arm. The support is adapted to be assembled on each pipe extending between the two flexible portions 51, 52, and for this purpose comprises for example a housing for each pipe.

Advantageously, the radiator 1 can assume a folded position in which the panel is held parallel to a face of the satellite, for example the support face 3 such as the north face, and it is then brought into the operational position. For this, the deployment may be implemented by the same motor as the one which rotates the foot, by means of a movement transmission device such as a gearbox provided with cams for example, or by a motor separate from the one which rotates the foot.

Although the figures described above only represent a single radiator, mounted on a support face such as the north face, the satellite may comprise at least a second radiator mounted for example on the south face and operating in the same manner. In addition, depending on the dimensions of the radiating panels, a same face may also comprise two radiators.

The invention claimed is:

1. A satellite configured to be stationed in geostationary orbit around a planet in a plane that is inclined relative to the ecliptic plane, the satellite comprising a radiator comprising:
   at least one panel having at least one radiative surface extending perpendicularly to a radiation axis, the panel being mounted so as to pivot relative to said radiation axis,
   a mounting foot carrying the panel, and
   a motor suitable for rotating the mounting foot about a rotation axis,
wherein the radiation axis and the rotation axis are tilted relative to each other by an operating angle corresponding to the angle of inclination of the satellite's orbital plane relative to the ecliptic plane, such that for any rotation of the mounting foot about the rotation axis, the radiative surface remains parallel to the ecliptic plane,
and wherein the radiator further comprises a guidance system for the panel, limiting rotation of the panel about the rotation axis, so as to maintain the panel in a given orientation relative to the satellite,
wherein the panel guidance system comprises a connecting arm connecting the panel to the satellite, mounted so as to pivot relative to the satellite about a first axis, and mounted so as to pivot relative to the panel about a second axis concurrent with the first axis at a meeting point coincident with a point of intersection between the radiation axis and the rotation axis.

2. The satellite according to claim 1, wherein the connecting arm comprises a bearing at each end, extending respectively around the first axis and the second axis.

3. The satellite according to claim 1, wherein the first axis and the second axis are perpendicular, and the connecting arm is a bent arm comprising two mutually perpendicular portions.

4. The satellite according to claim 1, wherein the first axis extends parallel to a support face of the satellite on which the radiator is mounted.

5. The satellite according to claim 1, wherein the panel has a substantially rectangular shape having a main dimension in a first direction, and the second rotation axis of the connecting arm relative to the panel is parallel to the first direction.

6. The satellite according to claim 1, further comprising a coolant circulation circuit suitable for circulation of a coolant in a closed loop between a piece of equipment of the satellite and the panel of the radiator, wherein the coolant circulation circuit comprises at least a first coolant pipe comprising at least:
- a first flexible portion extending transversely to the first rotation axis so as to be able to bend around a first bending point located on the first rotation axis, and
- a second flexible portion extending transversely to the second rotation axis so as to be able to bend around a second bending point located on the second rotation axis.

7. The satellite according to claim 6, wherein each coolant pipe further comprises rigid portions extending on either side of each flexible portion.

8. The satellite according to claim 6, wherein each coolant pipe comprises a continuous flexible portion comprising the first flexible portion, the second flexible portion, and an intermediate flexible portion connecting these.

9. The satellite according to claim 6, wherein the connecting arm further comprises a support for at least one coolant pipe.

10. The satellite according to claim 6, comprising a plurality of coolant pipes, each pipe comprising a first and a second flexible portion, wherein the first flexible portions of at least two pipes are placed next to each other transversely to the first rotation axis, and the second flexible portions of at least two pipes are placed next to each other transversely to the second rotation axis.

11. The satellite according to claim 6, further comprising at least a second coolant pipe, superimposed on the first pipe in a direction perpendicular to a plane defined by the first and the second rotation axis, the second pipe comprising a continuous flexible portion superimposed on the first flexible portion, the second flexible portion, and an intermediate portion connecting those of the first pipe.

12. The satellite according to claim 1, wherein the mounting foot comprises two portions, namely:
- a first portion suitable for mounting on the support face of the satellite, and
- a second portion on which the panel is mounted,
- the panel being mounted on the second portion by means of a bearing to allow rotation of the panel about the radiation axis.

13. The satellite according to claim 12, wherein the two portions of the mounting foot are straight, the first portion extending along the rotation axis and the second portion extending along the radiation axis.

14. The satellite according to claim 1, wherein the operating angle is 23.5°.

15. The satellite according to claim 1, wherein the radiator is mounted on a support face of the satellite, the mounting foot of the radiator being fixed on the satellite so that the rotation axis is perpendicular to a reference face of the satellite, the reference face being a north face or a south face of the satellite.

* * * * *